United States Patent
Sugaya (10) Patent No.: US 10,365,644 B2
(45) Date of Patent: Jul. 30, 2019

(54) APPLICATION, SMART DEVICE, DRONE, SERVER, SYSTEM METHOD, AND PROGRAM FOR AUTOMATICALLY CONTROL DRONE FLIGHT

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

(*) Notice: Subject to any disclaimer, the term of this patent is extended or adjusted under 35 U.S.C. 154(b) by 0 days.

(21) Appl. No.: 15/534,620

(22) PCT Filed: May 31, 2016

(86) PCT No.: PCT/JP2016/066039
§ 371 (c)(1),
(2) Date: Jun. 9, 2017

(87) PCT Pub. No.: WO2017/208353
PCT Pub. Date: Dec. 7, 2017

(65) Prior Publication Data
US 2019/0086913 A1    Mar. 21, 2019

(51) Int. Cl.
| | | |
|---|---|---|
| G05D 1/00 | (2006.01) | |
| B64C 13/16 | (2006.01) | |
| B64C 39/02 | (2006.01) | |
| G05D 1/10 | (2006.01) | |

(52) U.S. Cl.
CPC ........... *G05D 1/0016* (2013.01); *B64C 13/16* (2013.01); *B64C 39/02* (2013.01); *B64C 39/024* (2013.01); *G05D 1/00* (2013.01); *G05D 1/0033* (2013.01); *G05D 1/101* (2013.01); *B64C 2201/042* (2013.01); *B64C 2201/06* (2013.01); *B64C 2201/148* (2013.01); *Y02T 50/62* (2013.01)

(58) Field of Classification Search
CPC .... G05D 1/0016; G05D 1/101; G05D 1/0033; G05D 1/00; B64C 39/024; B64C 2201/06; B64C 2201/148; B64C 2201/042; B64C 39/02; B64C 13/16; Y02T 50/62
See application file for complete search history.

(56) References Cited

U.S. PATENT DOCUMENTS

| | | | |
|---|---|---|---|
| 2014/0297067 A1 | 10/2014 | Malay | |
| 2014/0316616 A1 | 10/2014 | Kugelmass | |
| 2017/0183095 A1* | 6/2017 | Liu | ........................ B64C 39/024 |
| 2017/0357255 A1* | 12/2017 | Li | ........................ B64C 39/024 |

FOREIGN PATENT DOCUMENTS

| | | |
|---|---|---|
| JP | 2014-199548 | 10/2014 |
| JP | 2015-191254 | 11/2015 |

* cited by examiner

*Primary Examiner* — Russell Frejd
(74) *Attorney, Agent, or Firm* — Lex IP Meister, PLLC (57) ABSTRACT

The present invention is to provide an application, a smart device, a drone, a server, a method, and a program for automatically controlling drone flight that improves safety and convenience. The application for automatically controlling drone flight that runs on a smart device 100 connected with a drone 200 drives a camera provided in the smart device 100, acquires an image taken by the camera, analyzes the acquired image, and controls the drone flight based on a result of the image analysis.

8 Claims, 9 Drawing Sheets

Speed control DB

| Battery level | Speed |
|---|---|
| 80% | 50 km/h |
| 60% | 40 km/h |
| 50% | 30 km/h |
| 30% | 15 km/h |

APPLICATION, SMART DEVICE, DRONE, SERVER, SYSTEM METHOD, AND PROGRAM FOR AUTOMATICALLY CONTROL DRONE FLIGHT

TECHNICAL FIELD

The present invention relates to an application, a smart device, a drone, a server, a method, and a program for automatically controlling drone flight that run on a smart device connected with a drone.

BACKGROUND ART

Recently, the drones which fly with the propeller rotated by the motor have been put to practical use. The operator instructs a drone to perform flight control and take still and moving images by using a wireless controller.

For such drone flight control, the constitution in which, when one drone operated by one operator comes close to a different drone operated by a different operator, the different drone's flight is controlled is disclosed (refer to Patent Document 1).

CITATION LIST

Patent Literature

Patent Document 1: JP 2015-191254A

SUMMARY OF INVENTION

However, in the constitution of Patent Document 1, the different drone's flight is controlled based on location information on one drone and a different drone. Accordingly, this constitution needs to acquire location information on the both drones. For example, when a specific object is found, the constitution hardly operates a drone, hardly fly a drone to a specific object, and hardly avoid a drone from this object. The drones are operated by the operators. If incorrectly operated, the drones may collide with each other. If flying to an area where is unreachable from the operator, a drone may be lost because it is inoperable. Therefore, the constitution has problems on safety and convenience.

An objective of the present invention is to provide an application, a smart device, a drone, a server, a method, and a program for automatically control drone flight that improve safety and convenience.

The first aspect of the present invention provides an application for automatically controlling drone flight that runs on a smart device connected with a drone, including:

a camera drive unit that drives a camera provided in the smart device;

an image acquisition unit that acquires an image taken by the camera;

an image analysis unit that analyzes the acquired image; and a drone flight control unit that controls the drone flight based on a result of the image analysis.

According to the first aspect of the present invention, an application for automatically controlling drone flight that runs on a smart device connected with a drone drives a camera provided in the smart device, acquires an image taken by the camera, analyzes the acquired image, and controls the drone flight based on a result of the image analysis.

The first aspect of the present invention falls into the category of an application for automatically controlling drone flight, but the categories of the method, the program, etc., have the same functions and effects.

The second aspect of the present invention provides the application according to the first aspect of the present invention, further including: an operation history acquisition unit that acquires an operation history from the drone, the flight of which is controlled; and an operation history display unit that displays the acquired operation history on a display unit provided in the smart device.

According to the second aspect of the present invention, the application according to the first aspect of the present invention acquires an operation history from the drone, the flight of which is controlled, and displays the acquired operation history on a display unit provided in the smart device.

The third aspect of the present invention provides the application according to the first aspect of the present invention, further including: an operation data acquisition unit that acquires operation data on the drone, the flight of which is controlled; and an operation data transmission unit that transmits the acquired operation data to a server connected through a network.

According to the third aspect of the present invention, the application according to the first aspect of the present invention acquires operation data on the drone, the flight of which is controlled and transmits the acquired operation data to a server connected through a network.

The fourth aspect of the present invention provides the application according to the first aspect of the present invention, further including: a power feed unit that feeds power from a rechargeable battery of the smart device to the connected drone; and a speed control unit that controls the speed of the drone based on the battery level of the rechargeable battery when feeding power.

According to the fourth aspect of the present invention, the application according to the first aspect of the present invention, feeds power from a rechargeable battery of the smart device to the connected drone and controls the speed of the drone based on the battery level of the rechargeable battery when feeding power.

The fifth aspect of the present invention provides the application according to the first aspect of the present invention that runs on the smart device connected with the drone through USB.

According to the fifth aspect of the present invention, the application according to the first aspect of the present invention runs on the smart device connected with the drone through USB.

The sixth aspect of the present invention provides a smart device including the application according to the first aspect of the present invention.

According to the sixth aspect of the present invention, a smart device includes the application according to the first aspect of the present invention.

The seventh aspect of the present invention provides a drone that is automatically controlled by the application according to the first aspect of the present invention.

According to the seventh aspect of the present invention, a drone is automatically controlled by the application according to the first aspect of the present invention.

The eighth aspect of the present invention provides a server that is connected with a smart device including the application according to the first aspect of the present invention through a network.

According to the eighth aspect of the present invention, a server is connected with a smart device including the application according to the first aspect of the present invention through a network.

The ninth aspect of the present invention provides a method for automatically controlling drone flight that runs on a smart device connected with a drone, including the steps of:

driving a camera provided in the smart device;
acquiring an image taken by the camera;
analyzing the acquired image; and
controlling the drone flight based on a result of the image analysis.

The tenth aspect of the present invention provides a computer program product for use in an application for automatically controlling drone flight that runs on a smart device connected with a drone, including a non-transitory computer usable medium having a set of instructions physically embodied therein, the set of instructions including computer readable program code, which when executed by the application causes the information processing unit to:

drive a camera provided in the smart device;
acquire an image taken by the camera;
analyze the acquired image; and
control the drone flight based on a result of the image analysis.

The present invention can provide an application, a smart device, a drone, a server, a method, and a program for automatically control drone flight that improve safety and convenience.

DESCRIPTION OF EMBODIMENTS

Embodiments of the present invention will be described below with reference to the attached drawings. However, these are illustrative only, and the technological scope of the present invention is not limited thereto.

Overview of System for Automatically Controlling Drone Flight 1

Figure 1:
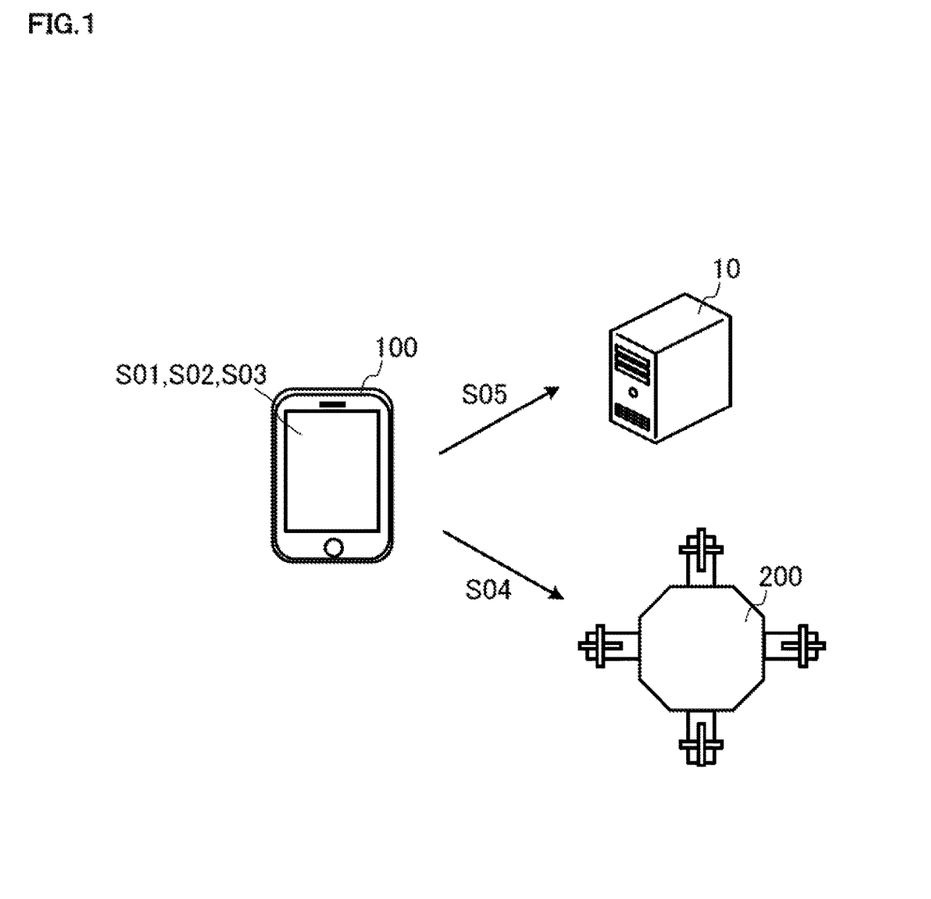
FIG. 1 shows a schematic diagram of the system for automatically controlling drone flight 1.

A preferable embodiment of the present invention will be described below with reference to FIG. 1. FIG. 1 shows an overview of the system for automatically controlling drone flight 1 according to a preferable embodiment of the present invention. The system for automatically controlling drone flight 1 includes a server 10, a smart device 100, and a drone 200.

In FIG. 1, the numbers of the smart devices 100 and the drones 200 are not limited to one and may be two or more. The processes to be described later may be achieved by any one of or in combination of any two or more of the server 10, the smart device 100, and the drone 200.

The server 10 is a server device data-communicatively connected with the smart device 100.

The smart device 100 is an information terminal connected with the drone 200 through a wired or unwired network and data-communicatively connected with the server 10. The smart device 100 has an application for automatically controlling drone flight that performs various control functions such as automatic drone flight control, imaging control, image analysis control, operation history display control, and operation data transmission control. The smart device 100 is, for example, an information terminal such as a mobile phone, a portable terminal, or a tablet terminal.

The drone 200 is an uninhabited airborne vehicle connected with the smart device 100 through wired connection such as USB or unwired connection such as radio waves, e.g., Bluetooth®, or light. The drone 200 performs various control functions such as flight, image analysis control, and operation history transmission control with the application for automatically controlling drone flight that is installed in the smart device 100.

In the following description, the processes are automatically performed by the smart device 100 through the above-mentioned application for automatically controlling drone flight without the need for user's operation.

First, the smart device 100 drives its own imaging unit such as a camera (Step S01). In the step S01, the application for automatically controlling drone flight that is installed in the smart device 100 automatically drives the imaging unit. The application for automatically controlling drone flight takes a moving or still image with the driven imaging unit.

The smart device 100 acquires the taken image (Step S02). In the step S02, the application for automatically controlling drone flight that is installed in the smart device 100 automatically acquires the taken image.

The smart device 100 analyzes the acquired image (Step S03). In the step S03, the application for automatically controlling drone flight that is installed in the smart device 100 automatically analyzes the image. The image analysis performed by the application for automatically controlling drone flight extracts, for example, a predetermined specific object contained in the taken image. Examples of the specific object include a sign, an obstacle, a harmful insect attached to farm products.

The smart device 100 controls the flight of the drone 200 based on a result of the image analysis (Step S04). In the step S04, the application for automatically controlling drone flight that is installed in the smart device 100 automatically controls the flight of the drone 200. The flight control of the drone 200 that is performed by the application for automatically controlling drone flight is, for example, to fly the drone 200 to the sign, to avoid the drone 200 from the obstacle, and to fly the drone to the place where the harmful insect was found to spread pesticide.

The smart device 100 transmits operation data on the imaging location, the flight path, the speed change, or the like of the drone 200 to the server 10 connected through a network at the end of drone flight (Step S05). The application for automatically controlling drone flight that is installed in the smart device 100 automatically transmits operation data to the server 10 at the end of drone flight or at a certain timing. The smart device 100 may transmit operation data to the server 10 as needed or at other timings.

The application for automatically controlling drone flight that is installed in the smart device 100 may display an operation history of the images, the flight path, the flight time, the battery level, the speed, etc., of the drone 200 on the smart device 100 or may store the operation history.

The application for automatically controlling drone flight that is installed in the smart device 100 may also feed power from a rechargeable battery of the smart device 100 to the connected drone 200. In this case, the application for automatically controlling drone flight may control the flight speed, etc., of the drone based on the battery level.

Configuration of System for Automatically Controlling Drone Flight 1

A configuration of the system for automatically controlling drone flight 1 according to a preferable embodiment of the present invention will be described with reference to FIG. 2.

Figure 2:
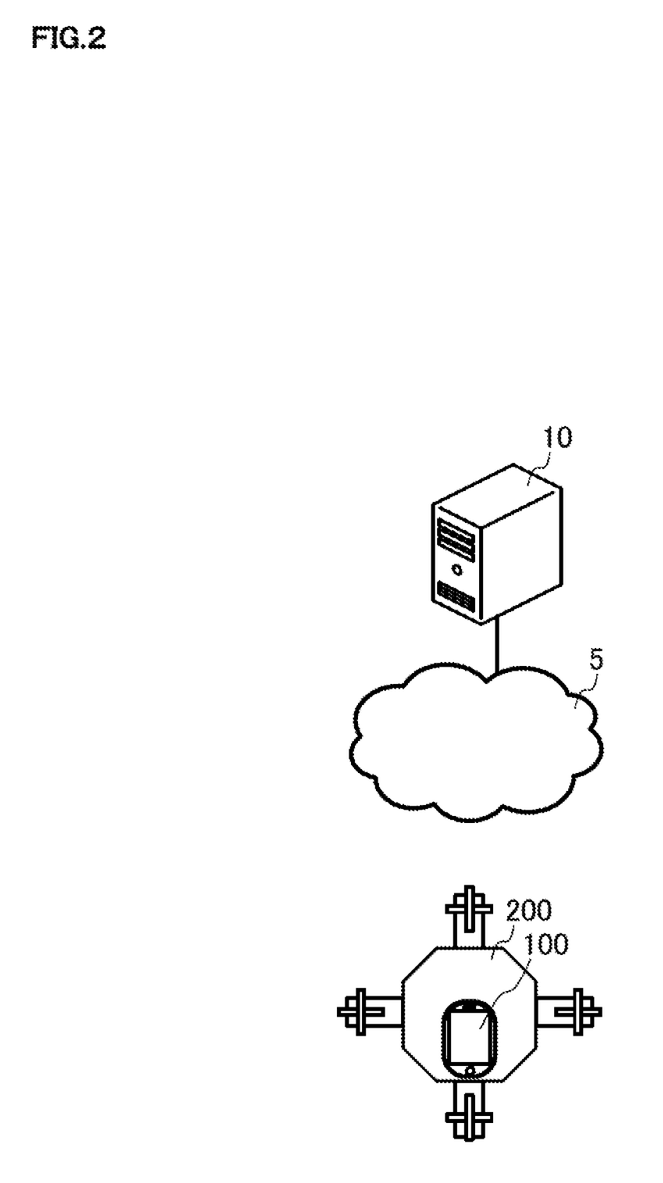
FIG. 2 shows an overall configuration diagram of the system for automatically controlling drone flight 1.

FIG. 2 shows a configuration of the system for automatically controlling drone flight 1. The system for automatically controlling drone flight 1 includes a server 10, a smart device 100, a drone 200 and a public line network 5 (e.g. the Internet network, a third or a fourth generation network). The numbers of the smart devices 100 and the drones 200 are not limited to one and may be two or more. The processes to be described later may be achieved by any one of or in combination of any two or more of the server 10, the smart device 100, and the drone 200.

The server 10 is the above-mentioned server device with the functions to be described later.

The smart device 100 is the above-mentioned information terminal with the functions to be described later.

The drone 200 is an uninhabited airborne vehicle with the functions to be described later.

Functions

Figure 3:
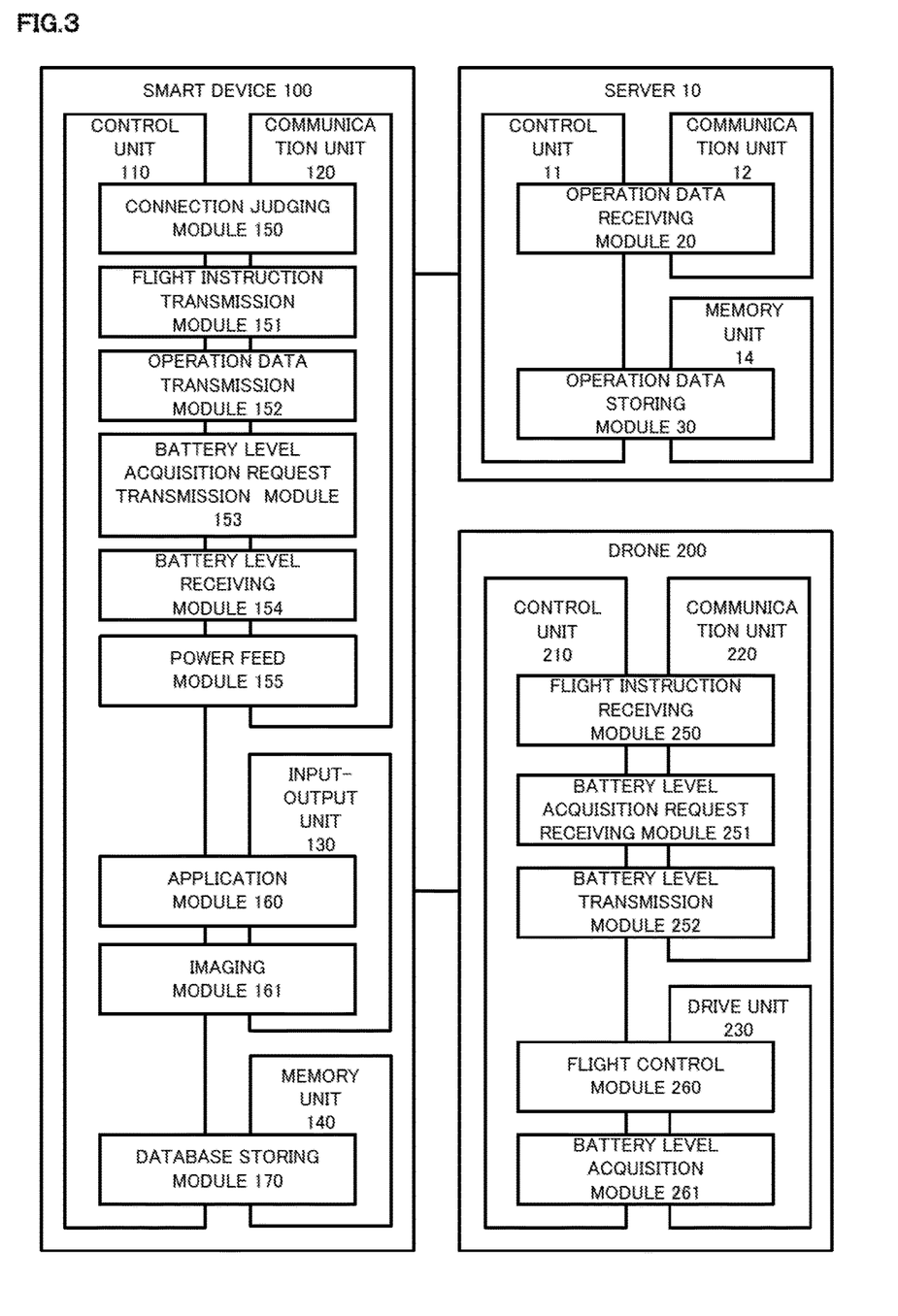
FIG. 3 shows a functional block diagram of the server 10, the smart device 100, and the drone 200.

The functions of the system for automatically controlling drone flight 1 will be described below with reference to FIG. 3. FIG. 3 shows a functional block of the server 10, the smart device 100, and the drone 200.

The server 10 includes a control unit 11 provided with a central processing unit (hereinafter referred to as "CPU"), a random access memory (hereinafter referred to as "RAM"), and a read only memory (hereinafter referred to as "ROM"); and a communication unit 12 such as a device with capability of communicating with other devices, for example, a Wireless Fidelity or Wi-Fi® enabled device complying with IEEE 802.11. The server 10 also includes a memory unit 14 such as a hard disk, a semiconductor memory, a record medium, or a memory card to store data.

In the server 10, the control unit 11 reads a predetermined program to achieve an operation data receiving module 20 in cooperation with the communication unit 12. Furthermore, in the server 10, the control unit 11 reads a predetermined program to achieve an operation data storing module 30 in cooperation with the memory unit 14.

The smart device 100 includes a control unit 110 including a CPU, a RAM, and a ROM; and a communication unit 120 such as a device with capability of communicating with other devices, for example, a Wireless Fidelity or Wi-Fi® enabled device complying with IEEE 802.11, a device with capability of wired connection such as USB, and a device with capability of unwired connection such as radio waves or light, in the same way as the server 10. The smart device 100 also includes an input-output unit 130 including a display unit outputting and displaying data and images that have been processed by the control unit 110; and an input unit such as a touch panel, a keyboard, or a mouse that receive an input from a user. The smart terminal 100 also includes a device such as GPS that acquires location information, a device such as a camera that takes an image, and a device that feeds power. The smart device 100 also includes a storage unit as the memory unit 140 in the same way as the server 10.

The application for automatically controlling drone flight is stored in the memory unit 140, started when receiving a connection with the drone 200 and a start instruction from the user to automatically perform the various controls of the drone 200.

In the smart device 100, the control unit 110 reads a predetermined program to achieve a connection judging module 150, a flight instruction transmission module 151, an operation data transmission module 152, a battery level acquisition request transmission module 153, a battery level receiving module 154, and a power feed module 155 in cooperation with the communication unit 120. Furthermore, in the smart device 100, the control unit 110 reads a predetermined program to achieve an application module 160 and an imaging module 161 in cooperation with the input-output unit 130. Still furthermore, in the smart device 100, the control unit 110 reads a predetermined program to achieve a database storing module 170 in cooperation with the memory unit 140.

The drone 200 includes a control unit 210 including a CPU, a RAM, and a ROM; and a communication unit 220 such as a device with capability of communicating with other devices, in the same way as the server 10 and the smart device 100. The drone 200 also includes a drive unit 230 that drives the propeller and a device that detects the direction of the drone 200.

In the drone 200, the control unit 210 reads a predetermined program to achieve a flight instruction receiving module 250, a battery level acquisition request receiving module 251, and a battery level transmission module 252 in cooperation with the communication unit 220. Furthermore, in the drone 200, the control unit 210 reads a predetermined program to achieve a flight control module 260 and a battery level acquisition module 261 in cooperation with the drive unit 230.

In the system for automatically controlling drone flight 1, the application for automatically controlling drone flight is installed in the smart device 100. This application for automatically controlling drone flight automatically controls the drone 200. The smart device 100 provided with the application for automatically controlling drone flight is connected with the server 10 through a public line network 5.

Drone Automatic Flight Control Process

Figure 4:
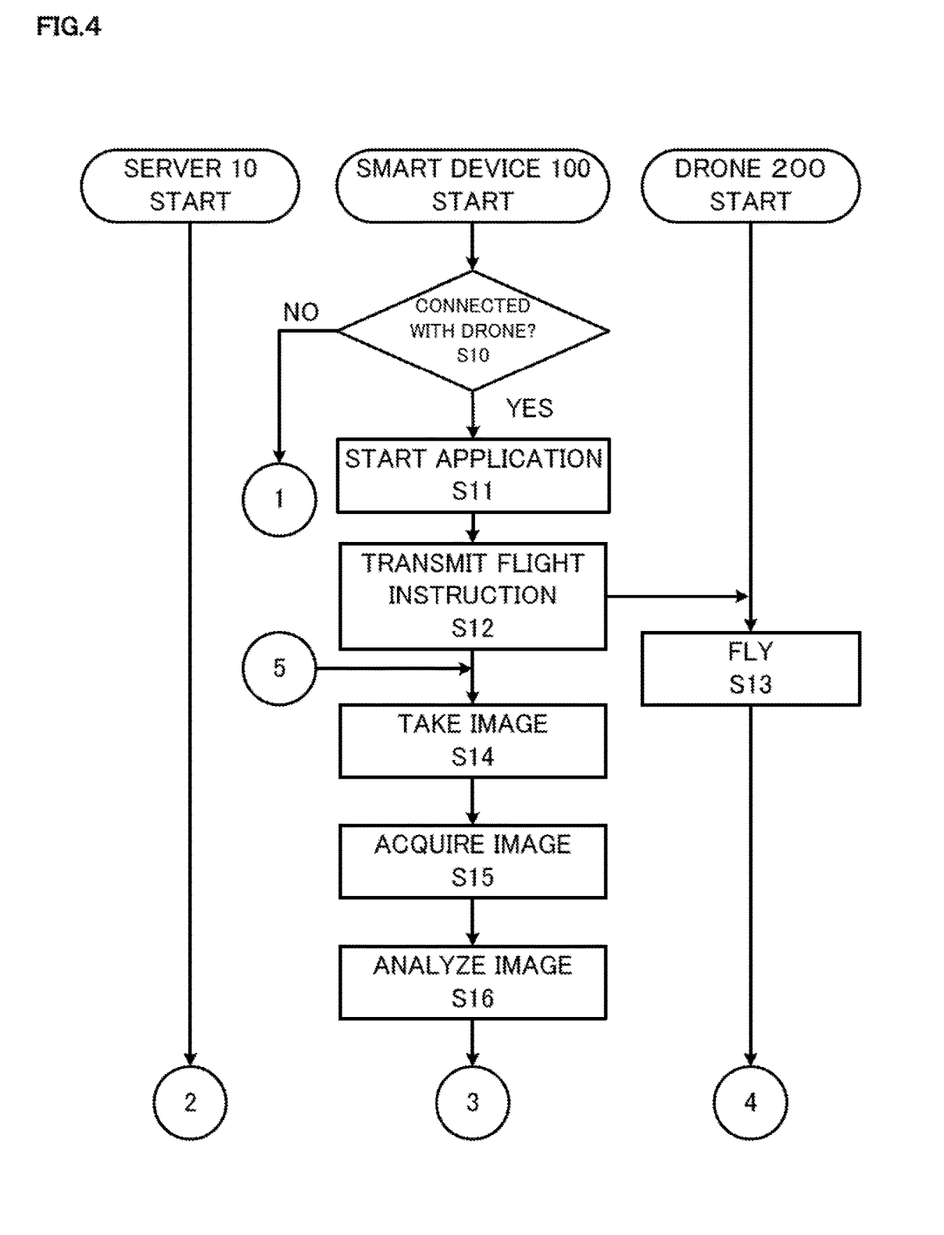
FIGS. 4 and 5 show a flow chart illustrating the procedure of the drone automatic flight control process performed by the server 10, the smart device 100, and the drone 200.
Figure 5:
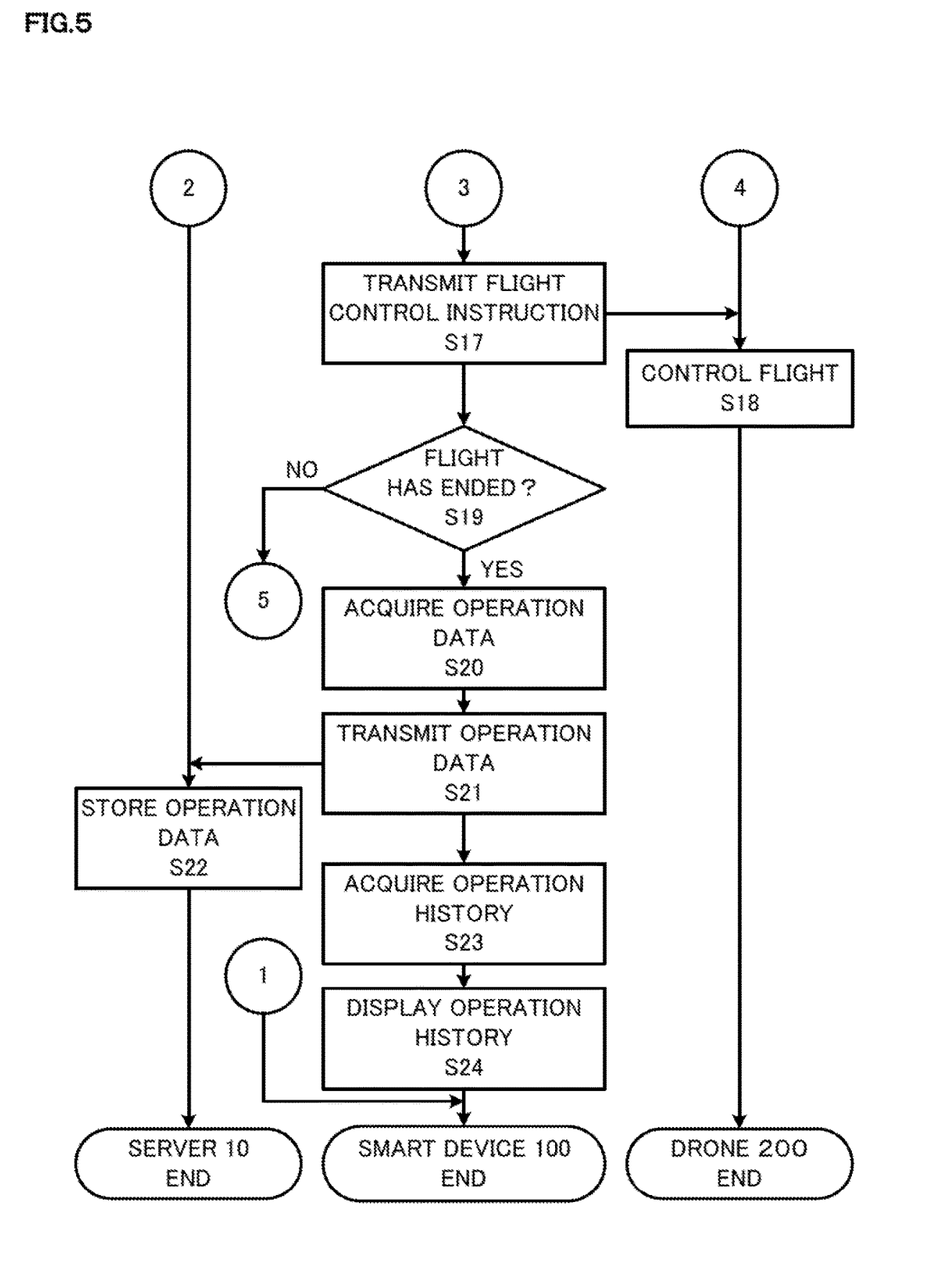

The drone automatic flight control process performed by the system for automatically controlling drone flight 1 will be described below with reference to FIGS. 4 and 5. FIGS. 4 and 5 show a flow chart illustrating the drone automatic flight control process performed by the server 10, the smart device 100, and the drone 200. The tasks executed by the modules of each of the above-mentioned units will be explained below together with this process.

The connection judging module 150 judges whether or not the smart device 100 has been connected with the drone 200 (Step S10). The smart device 100 is connected with the drone 200 through wired connection such as USB and a dedicated connector or through wireless connection such as radio waves and light. In this embodiment, the connection judging module 150 also judges whether or not the smart device 100 has been connected with the drone 200 through USB. The connection judging module 150 may judge whether or not the smart device 100 has been connected with the drone 200 in other ways.

If judging that the smart device 100 has not been connected with the drone 200 (NO) in the step S10, the connection judging module 150 ends this process.

On the other hand, if the connection judging module 150 judges that the smart device 100 has been connected with the drone 200 (YES) in the step S10, the application module 160 starts the application for automatically controlling drone flight (Step S11). In the following description, the processes performed by the application module 160 are to be automatically performed by the smart device 100 or the drone 200 through this application for automatically controlling drone flight unless otherwise mentioned.

The application module 160 automatically transmits a flight instruction to the drone 200 through the flight instruction transmission module 151 (Step S12). The application module 160 acquires a predetermined flight path and a predetermined flight range and generates a flight instruction based on the flight path and the flight range. For example, the application module 160 acquires the location information of the smart device 100 and generates an instruction to control the flight of the drone 200 based on the acquired location information and the flight path and the flight range. Furthermore, for example, the application module 160 also acquires map data and generates an instruction to control the flight of the drone 200 based on the map data and the acquired location information.

The flight instruction receiving module 250 receives the flight instruction. The flight control module 260 flies through the flight path and within the flight range based on the received flight instruction (Step S13).

The application module 160 automatically starts the imaging module 161 to take a still or moving image (Step S14).

The application module 160 automatically acquires the taken image (Step S15).

The application module 160 automatically analyzes the image (Step S16). For example, in the step S16, the application module 160 extracts a predetermined object from the image as the image analysis. Examples of the object include marks such as a signboard, a marking, a symbol, and a crest, obstacles such as a tree and a building, insects, especially harmful insects, and animals, especially destructive animals and injurious birds. The image analysis may perform a process other than the extraction of an object. The object is not limited to those mentioned above and may be others.

The application module 160 automatically transmits a flight control instruction to control the flight of the drone 200 through the flight instruction transmission module 151 based on a result of the image analysis (Step S17). For example, in the step S17, the control of the flight is, to fly the drone toward the extracted mark, to avoid the drone from obstacles, and to fly the drone toward the place where a harmful insect exists to spread pesticide. In other words, the control of the flight in the step S17 drives various functions of the drone 200.

The flight instruction receiving module 250 receives the flight control instruction. The flight control module 260 controls the flight based on the received flight control instruction (Step S18). For example, in the step S18, the drone 200 flies toward a mark, avoids obstacles, and flies toward the place where a harmful insect exists to spread pesticide. As a result, the drone 200 flies based on instructions from the smart device 100 without operation from the operator.

The application module 160 judges whether or not the flight has ended (Step S19). For example, in the step S19, the application module 160 acquires the current location information of the smart device 100 and judges whether or not this location information corresponds to the end of the predetermined flight path, whether or not the altitude is a predetermined altitude, or whether or not the drone 200 stops its motion. In the step S19, the application module 160 may judge whether or not the flight has ended in other ways.

If judging that the flight has not ended (NO) in the step S19, the application module 160 performs the step S14.

On the other hand, if judging that the flight has ended (YES) in the step S19, the application module 160 acquires operation data on the imaging location, the flight path, the flight speed change, the used amount of the battery, the image data, or the like of the drone (Step S20). The operation data may include information other than those mentioned above.

The application module 160 transmits the acquired operation data to the server 10 through the operation data transmission module 152 (Step S21).

The operation data receiving module 20 receives the operation data transmitted from the smart device 100. The operation data storing module 30 stores the received operation data (Step S22). In the step S22, the operation data storage module 30 may associate and store the operation data with either or both of the identifiers of the smart device 100 that transmitted the operation data and of the drone 200 connected with this smart device 100. The operation data stored in the server 10 may be transmitted to the smart device 100 and other terminals in response to a request from the smart device 100 or other terminals.

The application module 160 acquires the operation history of the drone 200 (Step S23). The operation history is the flight time, the flight date and time, the used amount of the battery, the flight speed, the imaging place, the performed flight control, etc. The application module 160 acquires the operation history from the start to the end of a flight that the smart device 100 temporarily stores. The smart device 100 may delete the temporarily stored operation history after the application module 160 acquires the operation history. The smart device 100 may acquire the operation history of the drone 200 as needed. In this case, the smart device 100 may acquire the operation history whenever the drone 200 performs an operation or may at a predetermined timing. Furthermore, the application module 160 may acquire the operation history in which the smart device 100 stores all the control details that the smart device 100 has the drone 200 perform. The configuration of the operation history can be appropriately changed. The operation data and the operation history may be similar information to each other.

The application module 160 displays the acquired operation history on the display unit of the smart device 100 as an operation history screen (Step S24).

Figure 8:
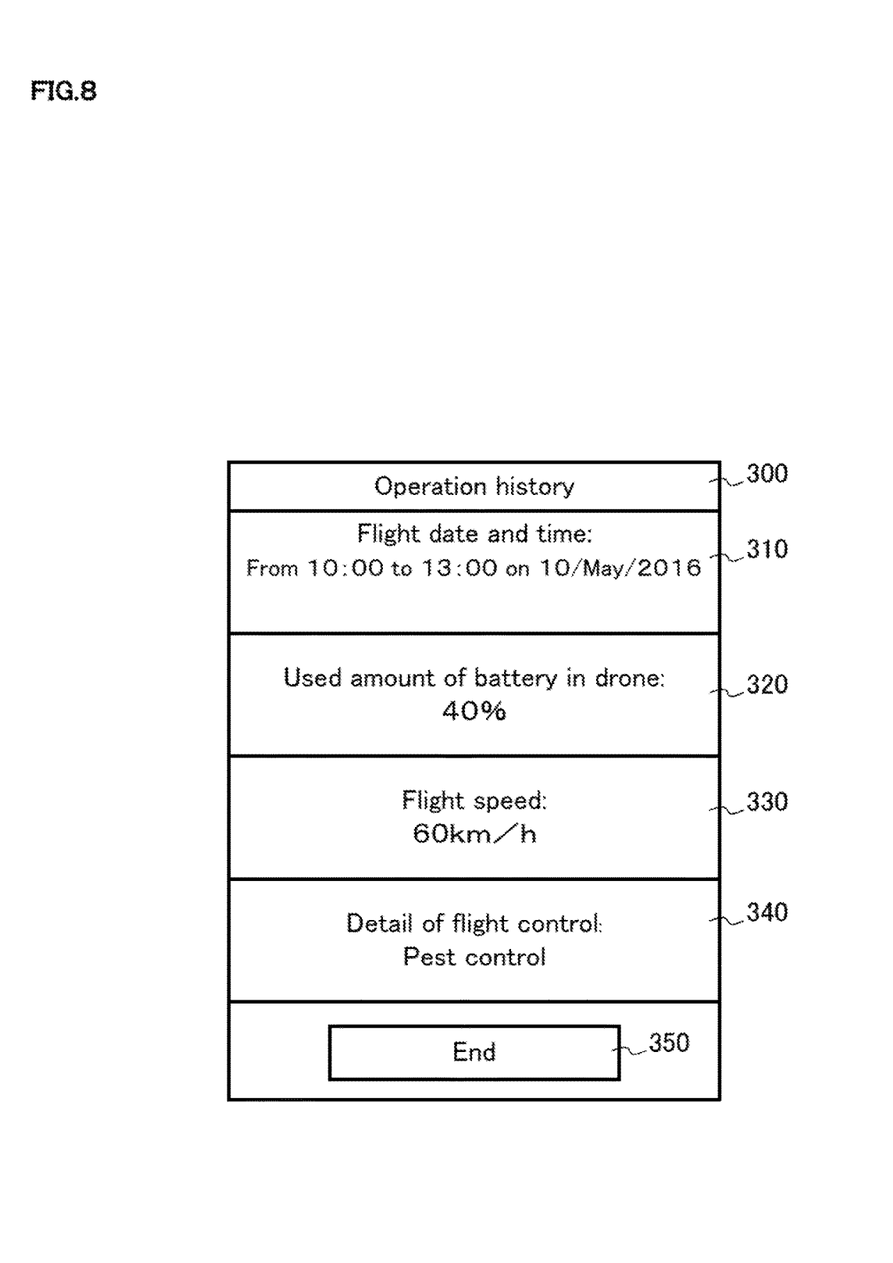
FIG. 8 shows an example of the operation history screen.

FIG. 8 shows one example of the operation history screen displayed by the application module 160. In FIG. 8, the application module 160 displays a screen title display area 300, a flight date and time display area 310, a used amount-of-battery display area 320, a flight speed display area 330, a flight control detail display area 340, and an end icon 350 in the operation history screen. The application module 160 displays a notification to show that this screen displays the operation history, in the screen title display area 300. The application module 160 also displays the date and time of a flight of the drone 200 in the flight date and time display area 310. The application module 160 also displays the used amount of the battery of the drone 200 in the used amount-of-battery display area 320. The application module 160 also displays the average flight speed of the drone 200 in the flight speed display area 330. The application module 160 also displays the detail of the control that the smart device 100 has the drone 200 perform, in the flight control detail display area 340. The items displayed in the operation history screen are not limit to those mentioned above and can be appropriately changed. The application module 160 may display the operation history screen in not limited to characters. For example, the application module 160 may display the items of the operation history in graphs, etc., in combination of characters and graphs, etc., or in other ways.

Accordingly, the image taken by the camera of the smart device 100 installed in the drone 200 can be analyzed, and the operations necessary for the drone 200 can be automatically performed based on a result of this image analysis. Therefore, no images need to be transmitted to the server 10, so that the drone can be operated even in areas not reached by radiowaves. Furthermore, the smart device 100 can automatically perform operation, take an image, and analyze the image.

Since the server 10 need not analyze an image, the server 10 does not need high-definition image data in real time. Therefore, the application of the smart device 100 can complete all processes except to transmit the results to the server 10. Furthermore, the server 10 and the smart device 100 only have to communicate with each other only before and after the flight, so that the smart device 100 can control the drone 200 even in areas not reached by radiowaves.

According to the above-mentioned processes, some functions performed by the drone 200 can be removed to the smart device 100. For example, the smart device 100 can operate the flight controller, the battery, the antenna of the controller, the GPS acquisition device, etc. that the drone 200 conventionally has. Furthermore, without the operator's hand (controller operation by the operator), the system for automatically controlling drone flight 1 can automatically judge everything. Yet furthermore, the drone 200 can be operated even in the areas not reached by radiowaves.

Power Feed Process

Figure 6:
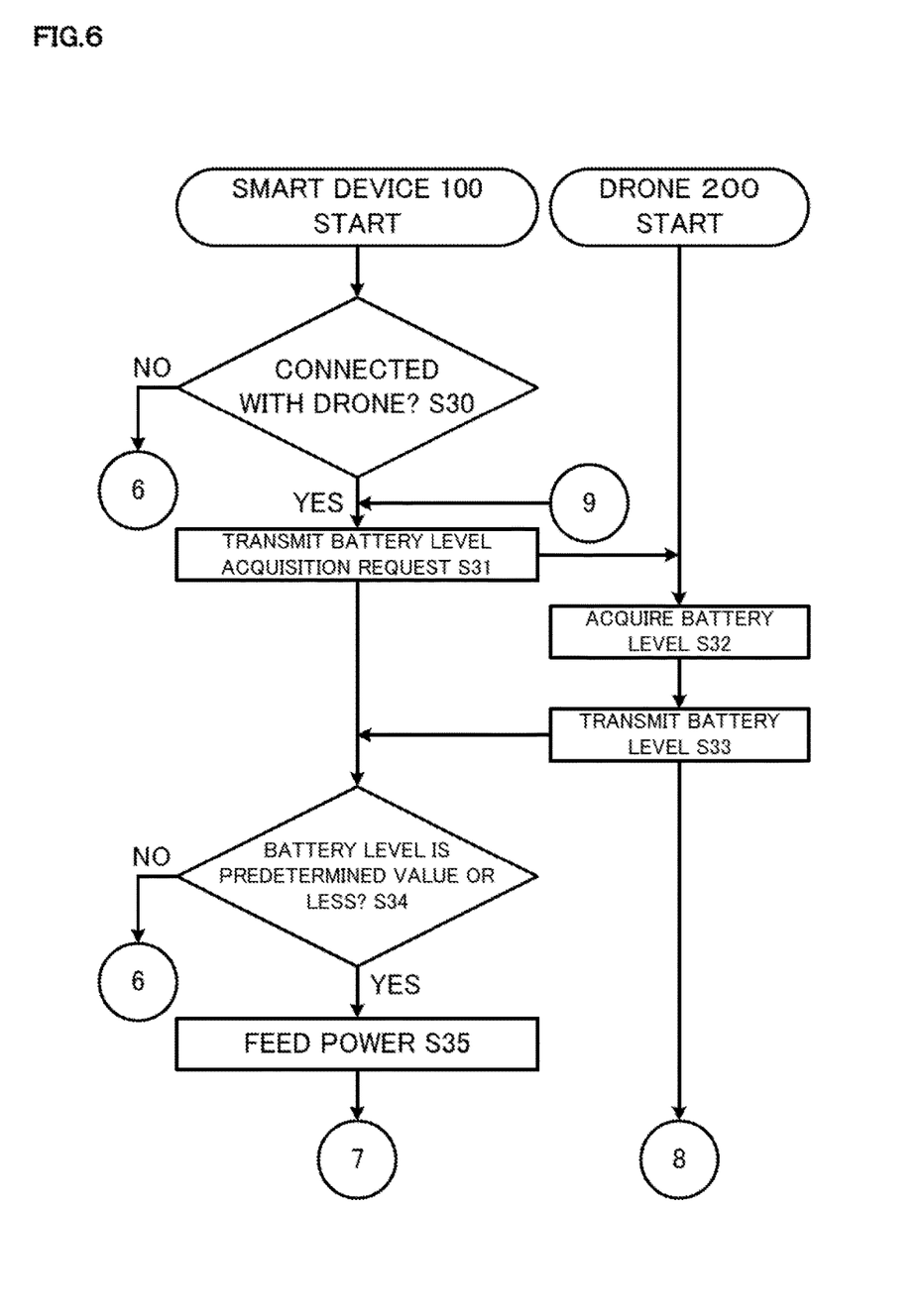
FIGS. 6 and 7 show a flow chart illustrating the procedure of the power feed process performed by the smart device 100 and the drone 200.
Figure 7:
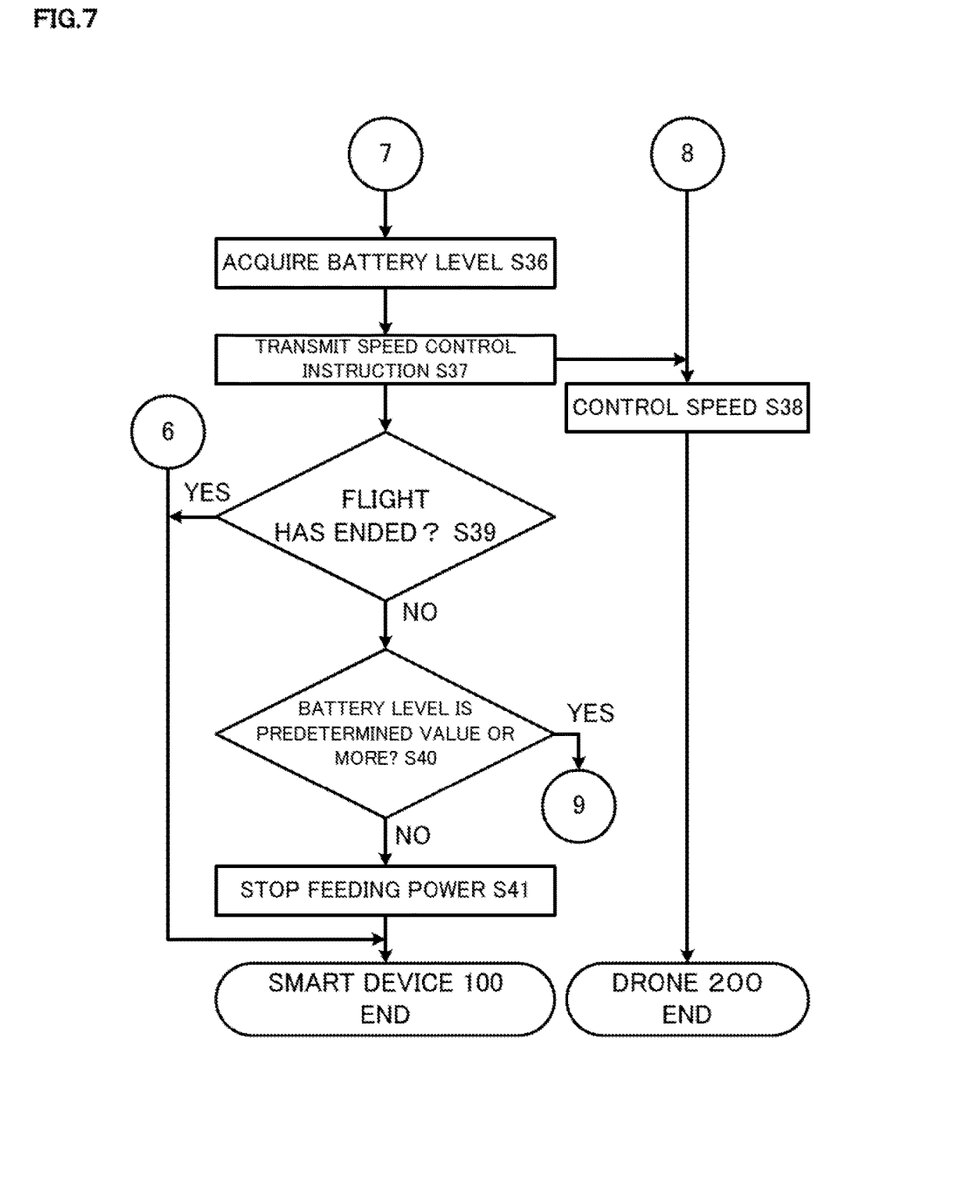

The power feed process performed by the system for automatically controlling drone flight 1 will be described below with reference to FIGS. 6 and 7. FIGS. 6 and 7 show a flow chart illustrating the power feed process performed by the smart device 100 and the drone 200. The tasks executed by the modules of each of the above-mentioned units will be explained below together with this process.

The connection judging module 150 judges whether or not the smart device 100 has been connected with the drone 200 (Step S30). The step S30 is processed in the same way as the above-mentioned step S10. If the connection judging module 150 judges that the smart device 100 has not been connected with the drone 200 (NO) in the step S30, the application module 160 ends this process.

On the other hand, if the connection judging module 150 judges that the smart device 100 has been connected with the drone 200 (YES) in the step S30, the application module 160 transmits a battery level acquisition request to the drone 200 through the battery level acquisition request transmission module 153 (Step S31).

The battery level acquisition request receiving module 251 receives the battery level acquisition request. The battery level acquisition module 261 acquires the battery level of the drone 200 (Step S32). The steps S31 and S32 may be performed at a predetermined interval. The predetermined interval may be an interval of time, e.g., 5, 10, 20 minutes or may be an interval of distance, e.g., 1, 10, 20 km. The predetermined interval may be changed as needed.

The battery level transmission module 252 transmits the acquired battery level to the smart device 100 (Step S33).

The battery level receiving module 154 receives the battery level. The application module 160 judges whether or not the battery level is a predetermined value or less (Step S34). For example, in the step S34, the application module 160 judges whether or not the acquired battery level is 10% or less, 20% or less, or other values or less. This predetermined value may be changed as needed. The application module 160 may always feed power without any relation to a predetermined value.

If judging that the battery level is not a predetermined value or less (NO) in the step S34, the application module 160 ends this process.

On the other hand, if judging that the battery level is a predetermined value or less (YES) in the step S34, the application module 160 feeds power from the rechargeable battery of the smart device 100 to the drone 200 through the power feed module 155 (Step S35).

The application module 160 automatically acquires the battery level of the smart device 100 (Step S36).

The application module 160 transmits a speed control instruction to control the flight speed of the drone 200 to the drone 200 through the flight instruction transmission module 151 based on the acquired battery level and the speed control database to be described later (Step S37).

Speed Control Database

Figure 9:
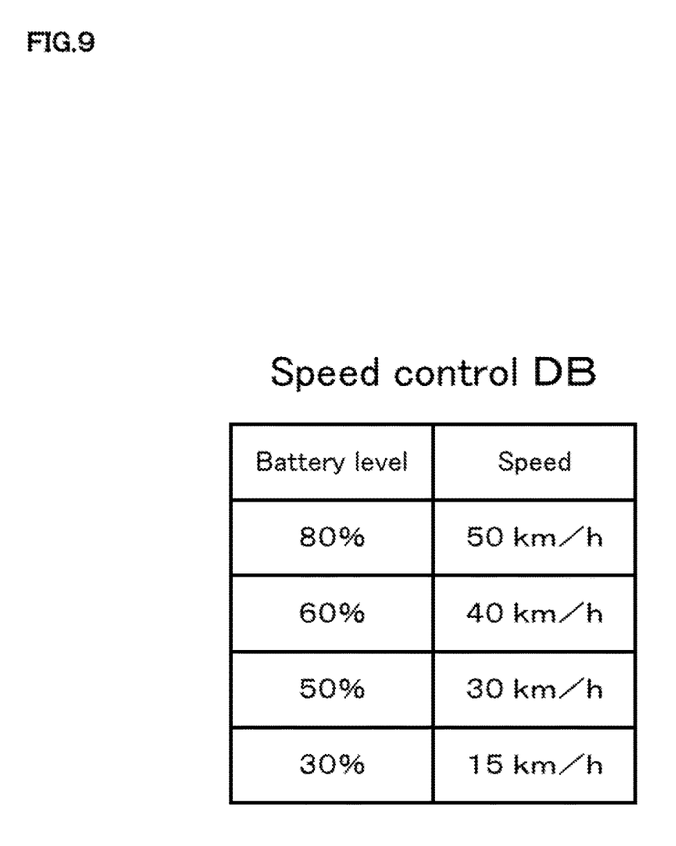
FIG. 9 shows a speed control database.

The speed control database that the database storing module 170 stores will be described below with reference to FIG. 9. FIG. 9 shows a speed control database. In FIG. 9, the database storing module 170 associates and stores the battery level of the smart device 100 with the speed of the drone 200. The battery level and the speed that the database storing module 170 stores may be input directly from the operator, acquired from other servers, databases, etc., previously set, or configured in other ways.

For example, if the acquired battery level is 80%, the flight instruction transmission module 151 transmits an instruction to the drone 200 to set the speed of 50 km/h that is associated with this 80% to the speed of the drone 200. The speed stored in the speed control database may be configured in other ways. For example, this speed may be a rate to the maximum or the current speed of the drone 200. Specifically, if the rate of 80% is associated with the battery level of 80%, the flight instruction transmission module 151 transmits a flight instruction to control the speed of the drone 200 to be 80% of the maximum or the current speed. The items and the values in the speed control database can be appropriately changed.

The flight instruction receiving module 250 receives the speed control instruction. The flight control module 260 controls the flight speed of the drone 200 based on the received speed control instruction (Step S38).

The application module 160 judges whether or not the flight has ended (Step S39). The step S39 is processed in the same way as the above-mentioned step S19.

If judging that the flight has ended (YES) in the step S39, the application module 160 ends this process. On the other hand, if judging that the flight has not ended (NO) in the step S39, the application module 160 judges whether or not the battery level is a predetermined value or more (Step S40). For example, in the step S40, the application module 160 judges whether or not the acquired battery level is a predetermined value or more. The predetermined value is, for example, 10 or 20%. This predetermined value may be changed as needed. For example, the application module 160 may judge whether or not the battery level is close to the extent that the various controls cannot be performed, for example, that an image cannot be taken.

If judging that the battery level is a predetermined value or more (YES) in the step S40, the application module 160 performs the process of the above-mentioned step S31. On the other hand, if judging that the battery level is not a predetermined value or more (NO) in the step S40, the application module 160 stops feeding power through the power feed module 155 (Step S41).

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to these above-mentioned embodiments. The effect described in the embodiments of the present invention is only the most preferable effect produced from the present invention. The effects of the present invention are not limited to that described in the embodiments of the present invention.

REFERENCE SIGNS LIST

1 System for automatically controlling drone flight
10 Server
100 Smart device
200 Drone

What is claimed is:

1. A smart device that automatically controls drone flight and is connected with a drone, the smart device comprising:
a camera;
a rechargeable battery; and
a processor that:
    drives the camera;
    acquires an image taken by the camera;
    analyzes the acquired image;
    controls the drone flight based on a result of the image analysis;
    feeds power from the rechargeable battery to the connected drone; and
    controls the speed of the drone based on the battery level of the rechargeable battery when feeding power.

2. The smart device according to claim 1, further comprising a display unit,
wherein the processor acquires an operation history from the drone, the flight of which is controlled, and displays the acquired operation history on the display unit.

3. The smart device according to claim 1, wherein the processor acquires operation data on the drone, the flight of which is controlled, and transmits the acquired operation data to a server connected through a network.

4. The smart device according to claim 1, wherein the smart device is connected with the drone through USB.

5. A drone that is automatically controlled by the smart device according to claim 1.

6. A server that is connected with the smart device according to claim 1 through a network.

7. A method for automatically controlling drone flight that runs on a smart device connected with a drone, comprising the steps of:
driving a camera provided in the smart device;
acquiring an image taken by the camera;
analyzing the acquired image;
controlling the drone flight based on a result of the image analysis;
feeding power from a rechargeable battery of the smart device to the connected drone; and
controlling the speed of the drone based on the battery level of the rechargeable battery when feeding power.

8. A computer program product for use in an application for automatically controlling drone flight that runs on a smart device connected with a drone, comprising a non-transitory computer usable medium having a set of instructions physically embodied therein, the set of instructions including computer readable program code, which when executed by the application causes the information processing unit to:
drive a camera provided in the smart device;
acquire an image taken by the camera;
analyze the acquired image;
control the drone flight based on a result of the image analysis;
feed power from a rechargeable battery of the smart device to the connected drone; and
control the speed of the drone based on the battery level of the rechargeable battery when feeding power.

* * * * *